No. 665,261. Patented Jan. 1, 1901.
E. W. PARISH.
APPARATUS FOR HEATING LIQUIDS.
(Application filed July 30, 1900.)
(No Model.) 2 Sheets—Sheet 2.

UNITED STATES PATENT OFFICE.

EDWARD W. PARISH, OF LEICESTER, ENGLAND.

APPARATUS FOR HEATING LIQUIDS.

SPECIFICATION forming part of Letters Patent No. 665,261, dated January 1, 1901.

Application filed July 30, 1900. Serial No. 25,366. (No model.)

*To all whom it may concern:*

Be it known that I, EDWARD WILLIAM PARISH, commercial traveler, a subject of the Queen of Great Britain, residing at South Knighton, Leicester, England, have invented certain new and useful Improvements Relating to Apparatus for Heating Liquids, of which the following is a specification.

This invention has reference to apparatus for heating liquids.

The chief object of my invention consists in providing apparatus of the above or a similar description with means whereby cool liquid is allowed to flow into the apparatus simultaneously with the withdrawal of hot liquid therefrom and in quantity corresponding to the amount of the hot liquid withdrawn, so that the apparatus is always kept fully supplied with liquid.

In order that my said invention may be clearly understood and readily carried into effect, I will describe the same with reference to the accompanying drawings, in which—

Figure 1:
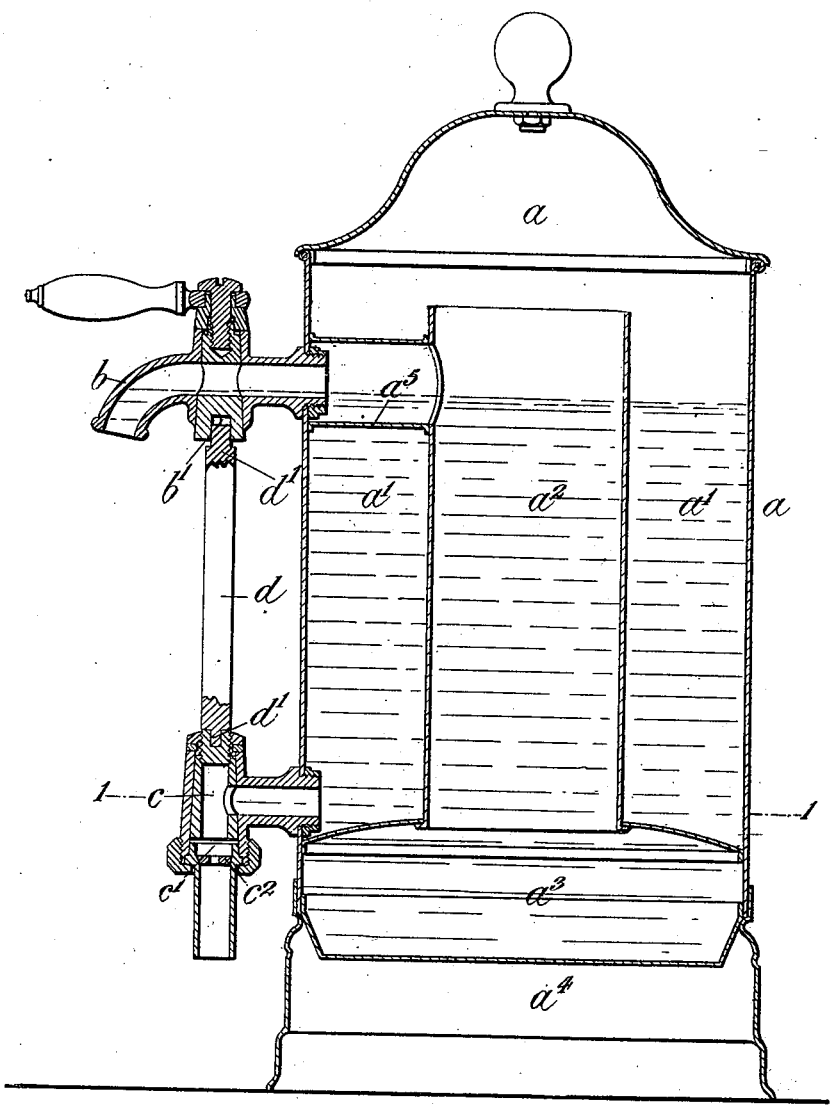
Figure 2:
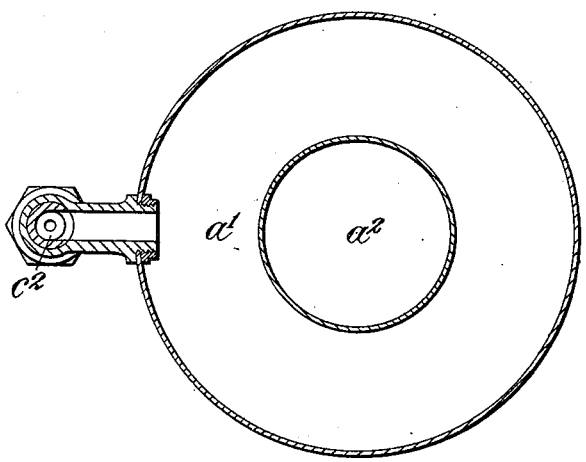

Figure 1 is a vertical section, and Fig. 2 a transverse section on the line 1 1 of Fig. 1, showing a liquid-heating apparatus constructed in accordance with my invention.

$a$ is the liquid-heating apparatus, $b$ the outlet tap or cock, and $c$ the inlet cock or valve.

The liquid-heating apparatus consists of two compartments $a'$ $a^2$, arranged concentrically, the former of which terminates at its lower end in a chamber $a^3$, which is heated by means of a gas or other burner arranged in the space $a^4$ beneath the said chamber. The upper end of the said compartment $a^2$ is open to the surrounding compartment $a'$ and is connected by a transverse passage or pipe $a^5$ to the cock or tap $b$. $c$ is the inlet cock or valve through which the incoming cool liquid enters the lower end of the outer compartment $a'$ and by rising therein as it becomes heated overflows into the central compartment $a^2$ when hot liquid is withdrawn therefrom through the cock $b$. As the liquid in the chamber $a^3$ becomes heated it rises in the central compartment $a^2$ ready to be withdrawn through the said cock $b$. It will therefore be seen that the cool liquid entering the apparatus through the cock $c$ cannot be withdrawn from the apparatus until it has become considerably heated and has risen in the compartment $a'$ and has overflowed into the compartment $a^2$.

In order to simultaneously operate the valves $b$ and $c$ and admit a quantity of cool liquid to the apparatus in a quantity corresponding to the amount of hot liquid withdrawn therefrom, I connect the plug of the outlet-cock $b$ with the plug of the inlet-cock $c$ by means of a rod or spindle $d$. The rod is provided with square or rectangular ends $d'$, which loosely engage with correspondingly-formed cavities or recesses in the plugs of the inlet and outlet cocks. The cavity $b'$ in the plug of the outlet-cock $b$ into which the upper end of the rod enters is of such a length that a space is left between the inner end of said cavity and the end of the rod. The square portion on the upper end of the rod $d$ is so formed that it can enter to a more or less degree into the aforesaid cavity, so that a certain amount of free longitudinal movement can take place between the rod and the plug of the cock. This free longitudinal movement between the plug of the outlet-cock and the rod insures that the inlet and outlet cocks shall be independent of one another in so far as the adjustment of each on its seat is concerned, and while permitting both of the cocks to be simultaneously operated does not interfere with the separate adjustment of the two cocks when necessary.

I desire it to be understood that I do not wish to confine myself to the use of the rod or spindle for connecting the inlet and outlet cocks together, as any other means may be employed which will accomplish the simultaneous operation of the said cocks and at the same time permit them to have a certain amount of longitudinal movement independently of each other for the purpose herein stated.

In order to regulate the pressure and quantity of liquid entering the apparatus through the aforesaid inlet-cock, I may provide said cock with a cavity or chamber $c'$ to receive one or more perforated disks $c^2$. The size of the openings or perforations in these disks may vary, so that by inserting one or more of them into said cavity or chamber $c'$ the passage through which the liquid flows into the heating apparatus may be more or less diminished or contracted.

What I claim is—

1. In a liquid-heating apparatus, the combination of a central upright compartment open at the top and communicating at its lower part with a chamber at the bottom of the apparatus, which chamber is adapted to be heated in any appropriate manner; of another compartment surrounding said central compartment; of an outlet for the heated liquid from the upper portion of said central compartment; of an inlet for the cool liquid to the lower portion of the said surrounding compartment; and of means for simultaneously opening and closing the said outlet and inlet.

2. In a liquid-heating apparatus, the combination of a central upright compartment open at the top and communicating at its lower part with a chamber at the bottom of the apparatus, which chamber is adapted to be heated in any appropriate manner; of another compartment surrounding said central compartment and located immediately above the aforesaid bottom chamber; of an outlet for the heated liquid from the upper portion of said central compartment; of an inlet for the cool liquid to the lower portion of the said surrounding compartment; of valves or cocks on said outlet and inlet; and of means for simultaneously operating said valves or cocks for the purpose specified.

3. In a liquid-heating apparatus, the combination of a central upright compartment open at the top and communicating at its lower part with a chamber at the bottom of the apparatus, which chamber is adapted to be heated in any appropriate manner; of another compartment surrounding said central compartment and located immediately above the aforesaid bottom chamber; of an outlet for the heated liquid from the upper portion of said central compartment; of an inlet for the cool liquid to the lower portion of the said surrounding compartment; of valves or cocks on said outlet and inlet; of means for simultaneously operating said valves or cocks and of means for regulating the area of passages in said valves or cocks, substantially as and for the purpose specified.

4. In a liquid-heating apparatus, the combination of a central upright compartment open at the top and communicating at its lower part with a chamber at the bottom of the apparatus, which chamber is adapted to be heated in any appropriate manner; of another compartment surrounding said central compartment and located immediately above the aforesaid bottom chamber; of an outlet for the heated liquid from the upper portion of said central compartment; of an inlet for the cool liquid to the lower portion of the said surrounding compartment; of valves or cocks on said outlet and inlet having their plugs arranged vertically; of a rod connecting together said plugs so that they will move simultaneously; of rectangular ends to said rod loosely fitting into recesses formed for their reception in the said plugs to permit a certain amount of free movement longitudinally, so that the plugs can be independently adjusted on their seatings; and of means for regulating the area of the passages in said valves or cocks, substantially as and for the purpose specified.

5. In a liquid-heating apparatus, the combination of a central upright compartment open at the top and communicating at its lower part with a chamber at the bottom of the apparatus, which chamber is adapted to be heated in any appropriate manner; of another compartment surrounding said central compartment and located immediately above the aforesaid bottom chamber; of an outlet for the heated liquid from the upper portion of said central compartment; of an inlet for the cool liquid to the lower portion of the said surrounding compartment, of valves or cocks on said outlet and inlet having their plugs arranged vertically; of a rod connecting together said plugs so that they will move simultaneously, of rectangular ends to said rod loosely fitting into recesses formed for their reception in the said plugs to permit a certain amount of free movement longitudinally, so that the plugs can be independently adjusted on their seatings; and of loose rings of varying internal diameter adapted to be fitted into one of the said valves or cocks to adjust the area of the passage therein, substantially as described.

In testimony whereof I have hereunto set my hand in presence of two subscribing witnesses.

EDWARD W. PARISH.

Witnesses:
WM. J. DOW,
F. J. SHERRINGTON.